United States Patent [19]

Shannon et al.

[11] Patent Number: 4,794,160

[45] Date of Patent: Dec. 27, 1988

[54] CROSSLINKABLE POLYCYCLIC POLYCARBONATE OLIGOMERS AND METHOD FOR THEIR PREPARATION

[75] Inventors: Thomas G. Shannon, Schenectady; Daniel J. Brunelle, Scotia, both of N.Y.

[73] Assignee: General Electric Company, Schenectady, N.Y.

[21] Appl. No.: 913,908

[22] Filed: Oct. 1, 1986

Related U.S. Application Data

[62] Division of Ser. No. 801,437, Nov. 25, 1985, abandoned.

[51] Int. Cl.$^4$ .............................................. C08G 63/62
[52] U.S. Cl. .................................... 528/370; 528/196; 528/198; 528/371
[58] Field of Search .............................. 528/370, 196

[56] References Cited

U.S. PATENT DOCUMENTS

| | | | |
|---|---|---|---|
| 2,763,672 | 9/1956 | Young et al. | 568/723 |
| 2,765,343 | 10/1956 | Benton et al. | 568/723 |
| 3,716,364 | 2/1973 | Gogola | 568/723 |
| 4,616,077 | 10/1986 | Silva | 528/370 |

FOREIGN PATENT DOCUMENTS 0127208 12/1984 European Pat. Off. .

*Primary Examiner*—Harold D. Anderson
*Attorney, Agent, or Firm*—William H. Pittman; James C. Davis, Jr.; James Magee, Jr.

[57] ABSTRACT

Polycyclic polycarbonate (or thiol analog) oligomers are prepared from a mixture of at least one bishaloformate with at least one tetraphenol, or thio analogs thereof. Such mixture may also contain at least one dihydroxy or dimercapto compound. The oligomers are formed by the reaction of such mixtures with alkali metal hydroxides and various amines. The polycyclic oligomer mixtures may be converted to crosslinked polycarbonates or their thiol analogs.

6 Claims, No Drawings

CROSSLINKABLE POLYCYCLIC POLYCARBONATE OLIGOMERS AND METHOD FOR THEIR PREPARATION

This is a division of application Ser. No. 801,437, filed Nov. 25, 1985, now abandoned.

This invention relates to new polycyclic oligomeric compositions, methods for their preparation and uses thereof. In particular, it relates to crosslinkable cyclic polycarbonate oligomers.

Polycarbonates are well known polymers which have good property profiles, particularly with respect to impact resistance, electrical properties, optical clarity, dimensional rigidity and the like. These polymers are generally linear, but can be made with branched sites to enhance their properties in specific ways. Low levels of branching are generally incorporated into the resin by copolymerizing into the polymer backbone a polyfunctional reagent to yield a thermoplastic polycarbonate resin with enhanced rheological properties and melt strength which make it particularly suitable for such types of polymer processing procedures as the blow molding of large, hollow containers and the extrusion of complex profile forms. Special manufacturing runs must be set aside to prepare these branched polycarbonate resins.

Sufficiently higher levels of branching sites in the resin will cause resin chains actually to join to each other to form partially or fully crosslinked resin networks which will no longer be thermoplastic in nature and which are expected to exhibit enhancements over corresponding linear resins in physical properties and/or in their resistance to abusive conditions, such as exposure to organic solvents. A wide variety of means have been employed to produce crosslinking in polycarbonate resins. They generally involve the incorporation of a suitably reactive chemical group into the resin chain at its time of manufacture, as an additive to the resin after manufacture, or both. These reactive groups and the reactions they undergo are generally different from those characteristic of polycarbonate resins themselves and therefore tend to have detrimental side effects on the physical and/or chemical properties of the polymer. The conventional test used to judge the success of these means for crosslinking is to observe the formation of gels due to the crosslinked material when a resin sample is mixed with a solvent, such as methylene chloride, in which normal linear polycarbonate resin is highly soluble.

A principal object of the present invention, therefore, is to provide useful new compositions of matter, and methods for their preparation and use.

A further object is to provide compositions which form crosslinked polycarbonates, and precursors therefor.

A still further object is to provide new polycarbonate compositions with advantageous properties.

Other objects will in part be obvious and will in part appear hereinafter.

In on of its aspects, the present invention includes compositions comprising polycyclic oligomers having structural units of both of the formulas

  (I)

and

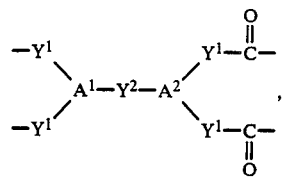  (II)

wherein:
each $R^1$ is independently a divalent aliphatic, alicyclic or aromatic radical;
each of $A^1$ and $A^2$ is a trivalent aromatic radical;
each $Y^1$ is independently oxygen or sulfur; and
$Y^2$ is a bridging radical in which one or two atoms separate $A^1$ from $A^2$.

Before proceeding with a detailed discussion of the invention, it may be useful to explain some terms used herein. The term "thiol analog", when used with reference to dihydroxy compounds, oligomers and polycarbonates, includes monothio and dithio compounds in which the carbon-sulfur bonds are single bonds only. The terms "resin" and "resinous composition" include polycarbonates and polymers containing thiol analogs of the carbonates.

As will be apparent from the above, the polycyclic oligomers of this invention may contain organic carbonate, thiolcarbonate and/or dithiolcarbonate units. The various $R^1$ values in formula I may be different but are usually the same, and may be aliphatic, alicyclic, aromatic or mixed; those which are aliphatic or alicyclic generally contain up to about 8 carbon atoms. Suitable $R^1$ values include ethylene, propylene, trimethylene, tetramethylene, hexamethylene, dodecamethylene, 1,4-(2-butenylene), 1,10-(2-ethyldecylene), 1,3-cyclopentylene, 1,3-cyclohexylene, 1,4-cyclohexylene, m-phenylene, p-phenylene, 4,4'-biphenylene, 2,2-bis(4-phenylene)propane, benzene-1,4-dimethylene (which is a vinylog of the ethylene radical and has similar properties) and similar radicals such as those which correspond to the dihydroxy compounds disclosed by name or formula (generic or specific) in U.S. Pat. No. 4,217,438, the disclosure of which is incorporated by reference herein. Also included are radicals containing non-hydrocarbon moieties. These may be substituents such as chloro, nitro, alkoxy and the like, and also linking radicals such as thio, sulfoxy, sulfone, ester, amide, ether and carbonyl. Most often, however, all $R^1$ radicals are hydrocarbon radicals.

Preferably at least about 60% and more preferably at least about 80% of the total number of $R^1$ values in the polycyclic oligomers, and most desirably all of said $R^1$ values, are aromatic. The aromatic $R^1$ radicals preferably have the formula

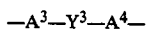  (III)

wherein each of $A^3$ and $A^4$ is a single-ring divalent aromatic radical and $Y^3$ is a bridging radical in which one or two atoms separate $A^3$ from $A^4$. The free valence bonds in formula III are usually in the meta or para positions of $A^3$ and $A^4$ in relation to $Y^3$ Such $R^1$ values may be considered as being derived from bisphenols of the formula HO—$A^3$—$Y^3$—$A^4$—OH. Frequent reference to bisphenol will be made hereinafter, but it should be understood that $R^1$ values derived from suitable compounds other than bisphenols may be employed as appropriate.

In formula III, the $A^3$ and $A^4$ values may be unsubstituted phenylene or substituted derivatives thereof, illustrative substituents (one or more) being alkyl, alkenyl (e.g., crosslinkable-graftable moieties such as vinyl and allyl), halo (especially chloro and/or bromo), nitro, alkoxy and the like. Unsubstituted phenylene radicals are preferred. Both $A^3$ and $A^4$ are preferably p-phenylene, although both may be o- or m-phenylene or one o- or m-phenylene and the other p-phenylene.

The bridging radical, $Y^3$, is one in which one or two atoms, preferably one, separate $A^3$ from $A^4$. It is most often a hydrocarbon radical and particularly a saturated radical such as methylene, cyclohexylmethylene, neopentylidene, 2-[2.2.1]bicycloheptylmethylene, ethylene, ethylidene, isopropylidene, cyclohexylidene, cyclopentadecylidene, cyclododecylidene or adamantylidene, especially an alkylidene radical. Also included, however, are unsaturated radicals and radicals which are entirely or partially composed of atoms other than carbon and hydrogen. Examples of such radicals are 2,2-dichloroethylidene, carbonyl, thio and sulfone. oor reasons of availability and particular suitability for the purposes of this invention, the preferred radical of formula III is the 2,2-bis(4-phenylene)propane radical, which is derived from bisphenol A and in which $Y^3$ is isopropylidene and $A^3$ and $A^4$ are each p-phenylene.

As noted, each $Y^1$ value is independently oxygen or sulfur. Most often, all $Y^1$ values are oxygen and the corresponding compositions are cyclic polycarbonate oligomer mixtures.

An essential feature of the compositions of this invention is the presence therein of structural units having formula II, which lead to an overall polycyclic structure. The number of rings in any individual molecule of said compositions will depend on the proportions of reactants and the reaction conditions. The following molecular structures are illustrative.

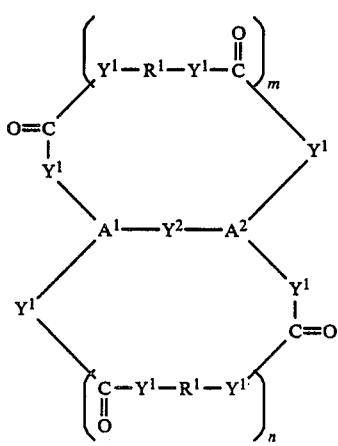

(IV)

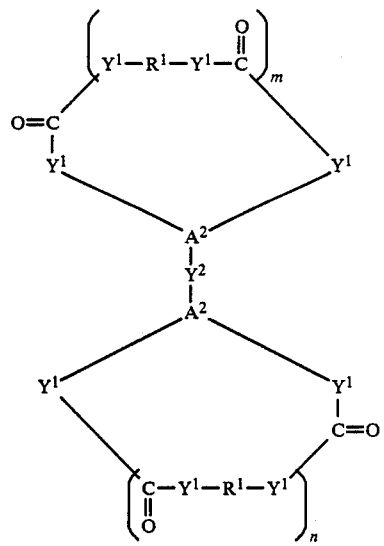

(V)

wherein m and n are integers, typically from 1 to about 11.

In formula II, each $Y^1$ value may be oxygen or sulfur and all $Y^1$ values are usually oxygen. The $Y^2$ values are bridging radicals similar to those defined hereinabove for $Y^3$, and are usually methylene, carbonyl, thiol, sulfoxy or sulfone. The $A^1$ and $A^2$ values are usually trivalent single-ring aromatic radicals; they are preferably unsubstituted but may contain substituents such as those previously identified with respect to $A^3$ and $A^4$.

The structural units of formula II may be considered as being derived from the corresponding tetraphenols and their thiol analogs. Illustrative tetraphenols are bis(2,4-dihydroxy-3-methylphenyl)methane, 2,2',4,4'-tetrahydroxybiphenyl, 2,2',4,4'-tetrahydroxybenzophenone, bis(2,4-dihydroxyphenyl) sulfide, bis(2,4-dihydroxyphenyl) sulfoxide and bis(2,5-dihydroxyphenyl) sulfone.

Certain of these tetraphenols, particularly the bis(2,4-dihydroxy-3-alkylphenyl)methanes, are novel compounds. Therefore, another aspect of the invention is tetraphenols having the formula

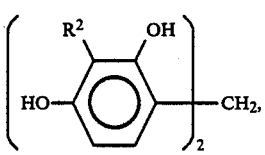

(VI)

wherein $R^2$ is a $C_{1-4}$ primary or secondary alkyl radical and especially methyl.

Such tetraphenols may be prepared by reacting a 2-alkylresorcinol with formaldehyde under acidic conditions, typically in aqueous solution and at a temperature in the range of 10°–50° C. Most often, approximately equimolar amounts of 2-alkylresorcinol and acid are present and the molar ratio of 2-alkylresorcinol to formaldehyde is about 3-6:1. The following example is illustrative. All parts are by weight.

EXAMPLE 1

To a solution of 248.14 parts (2 moles) of 2-methylresorcinol in one liter of 2 N aqueous hydrochloric acid was added 32.6 parts of 38% aqueous formaldehyde solution (0.4 mole of formaldehyde). The mixture was stirred for two hours at about 20° C., whereupon a white solid precipitated. It was removed by filtration, washed several times with water and dried. The product was shown by infrared and nuclear magnetic resonance spectroscopy to be the desired bis(2,4-dihydroxy-3-methylphenyl)methane. The yield was 49.2 parts, or 50% of theoretical.

The polycyclic oligomers of this invention include dimers, trimers and tetramers similar to those disclosed in the following U.S. Pat. Nos.:

| 3,155,683 | 3,386,954 |
|---|---|
| 3,274,214 | 3,422,119. |

They also include polycyclic oligomer mixtures similar to the mixtures disclosed in copending, commonly owned application Ser. No. 704,122, filed Feb. 22 1985, the disclosure of which is incorporated by reference herein.

The polycyclic oligomer mixtures consist essentially of oligomers having degrees of polymerization from 2 to about 30 and preferably to about 20, with a major proportion being up to about 12 and a still larger proportion up to about 15. Since they are mixtures, these compositions have relatively low melting points as compared to single compounds. The polycyclic oligomer mixtures are generally liquid at temperatures above 300° C. and most often at temperatures above 225° C.

The mixtures of this invention contain very low proportions of acyclic oligomers, generally undetectable amounts and very seldom more than about 5% by weight. They also contain low percentages, frequently less than 30%, of polymers (linear or cyclic) having a degree of polymerization greater than about 30. Such polymers are frequently identified hereinafter as "high polymer". These properties, coupled with the relatively low melting points and viscosities of the polycyclic oligomer mixtures, contribute to their utility in the invention.

The polycyclic oligomers of this invention may be prepared by a condensation reaction involving at least one compound selected from the group consisting of bishaloformates and thio analogs thereof, said compounds having the formula

and at least one compound selected from the group consisting of tetraphenols and thiol analogs thereof, said compounds having the formula $$(HY^1)_2A^1-Y^2-A^2(Y^1H)_2 \quad (VIII)$$

wherein $R^1$, $A^1$, $A^2$, $Y^1$ and $Y^2$ are as defined hereinabove and $X^1$ is chlorine or bromine. The condensation reaction typically takes place interfacially when a solution of said compounds in a substantially non-polar organic liquid is contacted with a tertiary amine from a specific class and an aqueous alkali metal hydroxide solution.

Accordingly, another embodiment of the present invention is a method for preparing a composition comprising polycyclic polycarbonate or thiol analog oligomers which comprises contacting (A) a composition comprising a mixture of (1) at least one compound having formula VII and (2) at least one compound of formula VIII, said mixture optionally also containing (3) at least one bis(active hydrogen) compound having the formula $$R^3(Y^3H)_2, \quad (IX)$$

wherein each $Y^3$ is independently sulfur when the corresponding $R^3$ is aliphatic or alicyclic and oxygen or sulfur when the the corresponding $R^3$ is aromatic, with (B) at least one oleophilic aliphatic or heterocyclic tertiary amine and (C) an aqueous alkali metal hydroxide solution having a concentration of about 0.1–10 M;

said contact being effected under conditions resulting in high dilution of reagent A, or the equivalent thereof, in a substantially non-polar organic liquid which forms a two-phase system with water, for a period of time sufficient to form said polycyclic oligomers; and recovering said oligomers.

Reagent A, as indicated, is a composition comprising a mixture of compounds of formulas V and VI (reagents A-1 and A-2, respectively) and, optionally, compounds of formula VI (reagent A-3). It may also contain other compounds, including oligomers of the formula

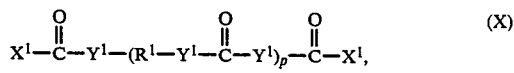

wherein $R^1$, $Y^1$ and $X^1$ are as previously defined and n is a small number, typically about 1–4.

While the $X^1$ values in formulas VII and X may be chlorine or bromine, the bischloroformates, in which $X^1$ is chlorine, are most readily available and their use is therefore preferred. The compounds of formula VIII may be tetraphenols or mono- or polythiol analogs thereof, with the tetraphenols being preferred. (Frequent reference to bischloroformaees and tetraphenols will be made hereinafter, but it should be understood that all compounds of formulas VII and VIII, respectively, are included.)

Suitable bis(active hydrogen) compounds of formula IX (reagent A-3) include diols and thiol analogs thereof having divalent radicals of formula III which are different from the corresponding divalent radicals in the compound of foruula VII, as well as other dihydroxyaromatic compounds and thiol analogs thereof. Any cyclic oligomers containing divalent aliphttic radicals (or their vinylogs) flanked by two oxygen atoms are bbtained from a mixture of compounds identifiable as reagent A-1.

The proportion of reagent A-2 in the reaction mixture (and of units of formula II in the oligomer product) depends to some extent on the amount of crosslinking desired in the final linear polycarbqnate. In general, about 0.5–10.0 mole percent (based on monomeric units in total reagent A), and especially about 1–5 mole percent, will produce a crosslinked product having the desired properties.

However, it is within the scope of the invention to prepare a polycyclic oligomer product having a higher proportion of units of formula II and to dilute it with a conventional cyclic oligomer product prior to formation of the crosslinked linear polycarbonate. Therefore, the presence of about 0.5–12.0 mole percent of component A-2 is contemplated. Higher proportions than about 12 mole percent may cause premature crosslinking via formation of branched polycarbonates, resulting in gel formation. Reagent A-3, when present, generally comprises up to about 50% by weight, most often up to about 20% and preferably up to about 10%, of total reagent A.

The bischloroformate may be employed in substantially pure, isolated form or as a cuude bischloroformate product. Suitable crude products may be prepared by any known methods for bischooroformate preparation. Typically, at least one bisphenol is reacted with phosgene in the presence of a substantially inert organic liquid, as disclosed in the following U.S. Pat.:

| 3,255,230 | 3,966,785 |
| 3,312,661 | 3,974,126. |

The disclosures of these patents are incorporated by reference herein. In addition to the bisphenol bischloroformate, such crude bischloroformate products may contain oligomer bischloroformates containing up to 4 bisphenol units. They may also contain minor amounts of higher oligomer bischloroformates and of monochloroformates corresponding to any of the aforementioned bischloroformates. Higher ligomer monoand bischloroforaates are preferably present, if at all, only in trace amounts.

More preferably, the preparation of the crude bischloroformate product takes place in the presence of aqueuus alkali. The pH of the reaction mixture may be up to about 12. It is generally found, however, that the proportion of high polymer in the cyclic oligomer mixture is minimized by employing a crude bischloroformate product comprising a major amount of bisphenol bischloroformate and only minor amounts of any oligomer bischloroformates. Such products may be obtained by the method disclosed in copending, commonly assigned application Ser. No. 790,909, filed Oct. 24, 1985, the disclosure of which is also incorporated by reference herein. In that method, phosgene is passed into a mixture of a substantially inert organic liquid and a bisphenol, said mixture being maintained at a temperature within the range of about 10°–40° C., the phosgene flow rate being at least 0.15 equivalent per equivalent of bisphenol per minute when the temperature is above 30° C. An aqueous alkali metal or alkaline earth metal base solution is simultaneously introduced as necessary to maintain the pH of the aqueous phase in the range of 0.5–8. By this method, it is possible to prepare bischloroformate in high yield while using a relatively small proportion of phosgene, typically up to about 1.1 equivalent per equivalent of bisphenol.

When one of these methods is employed, it is obvious that the crude bischloroformate product will ordinarily be obtained as a solution in a substantially non-polar organic liquid such as those disclosed hereinafter. Depending on the method of preparation, it may be desirable to wash said solution with a dilute aqueous acidic solution to remove traces of base used in preparation.

The tertiary amines useful as reagent B ("tertiary" in this context denoting the absence of N—H bonds) generally comprise those which are oleophilic (i.e., which are soluble in and highly active in organic media, especially those used in the oligomer preparation method of this invention), and more particularly those which are useful for the formation of polycarbonates. Reference is made, for example, to the tertiary amines disclosed in the aforementioned U.S. Pat. Nos. 4,217,438 and in 4,368,315, the disclosure of which is also incorporated by reference herein. They include aliphatic amines such as triethylamine, tri-n-propylamine, diethyl-n-propylamine and tri-n-butylamine and highly nucleophilic heterocyclic amines such as 4-dimethylaminopyridine (which, for the purposes of this invention, contains only one active amine group). The preferred amines are those which dissolve preferentially in the organic phase of the reaction system; that is, for which the organic-aqueous partition coefficient is greater than 1. This is true because intimate contact between the amine and reagent A is essential for the formation of the cyclic oligomer mixture. For the most part, such amines contain at least about 6 and preferably about 6–14 carbon atoms.

The amines most useful as reagent B are trialkylamines containing no branching on the carbon atoms in the 1- and 2- positions. Especially preferred are tri-n-alkylamines in which the alkyl groups contain up to about 4 carbon atoms. Triethylamine is most preferred by reason of its particular availability, low cost, and effectiveness in the preparation of products containing low percentages of linear oligomers and high polymers.

Reagent C is an aqueous alkali metal hydroxide solution. It is most often lithium, sodium or potassium hydroxide, with sodium hydroxide being preferred because of its availability and relatively low cost. The concentration of said solution is about 0.2–10 M and preferably no higher than about 3 M.

The fourth essential component in the cyclic oligomer preparation method of this invention is a substantially non-polar organic liquid which forms a two-phase system with water. The identity of the liquid is not critical, provided it possesses the stated properties. Illustrative liquids are aromatic hydrocarbons such as toluene and xylene; substituted aromatic hydrocarbons such as chlorobenzene, o-dichlorobenzene and nitrobenzene; chlorinated aliphatic hydrocarbons such as chloroform and methylene chloride; and mixtures of the foregoing with ethers such as tetrahydrofuran.

To prepare the cyclic oligomer mixture according to the above-described method, the reagents and components are maintained in contact under conditions wherein reagent A is present in high dilution, or equivalent conditions. Actual high dilution conditions, requiring a large proportion of organic liquid, may be employed but are usually not preferred for cost and convenience reasons. Instead, simulated high dilution conditions known to those skilled in the art may be employed. For example, in one embodiment of the method reagent A (i.e., a combination of all constituents thereof) or reagents A and B are added gradually to a mixture of the other materials. It is within the scope of this embodiment to incorporate reagent B in the mixture to which reagent A is added, or to add it gradually, either in admixture with reagent A or separately. Continuous or incremental addition of reagent B is frequently preferred, whereupon the cyclic oligomer mixture is obtained in relatively pure form and in high yield.

Although addition of reagent A neat (i.e., without solvents) is wtthin the scope of this embodiment, it is frequently inconvenient because many bischloroformates are solids. Therefore, it is preferably added as a solution in a portion of the organic liquid. The proportion of organic liquid used for this purpose is not critical; about 25–75% by weight, and especially about 40–60%, is preferred.

The reaction temperature is generally in the range of about 0°–50° C. It is most often about 0°–40° C and preferably 20°–40° C.

For maximization of the yield and purity of polycyclic oligomers as opposed to high polymer and insoluble and/or intractable by-products, it is preferred to use not more than about 0.7 mole of reagent A (calculated as monomeric material) per liter of organic liquid present in the reaction system, including any liquid used to dissolve reagent A. Preferably, about 0.003–0.6 mole of reagent A is used when it consists entirely of reagents A-1 and A-2, and no more than about 0.5 mole is used when it contains reagent A-3. It should be noted that this is not a molar concentration in the organic liquid when reagent A is added gradually, since said reagent is consumed as it is added to the reaction system.

The molar proportions of the reagents constitute another important feature for yield and purity maximization. the preferred molar ratoo of reagent B to reagent A is about 0.1–1.0:1 and most often about 0.2–0.6:1. The preferred molar ratio of reagent C to reagent A is about 1.5–3:1 and most often about 2-3:1.

Recovery of the poly yclic oligomers normally means merely separating the same from diluent (by known methods such as vacuum evaporation) and, optionally, from high polymer and other impurities. When other reagents are added to reagent C and the preferred conditions and material proportions are otherwise employed, the polycyclic oligomers (obtained as a solution in the organic liquid) contain minimal amounts of high polymer and insoluble material. Depending on the intended use of the polycyclic oligomer mixture, the separation step may then be unnecessary.

When separation is necessary, the unwanted impurities may be removed in the necessary amounts by conventional operations such as combining the solution with a non-solvent for said impurities. Illustrative non-solvents include ketones such as acetone and methyl isobutyl ketone and esters such as methyl acetate and ethyl acetate. Acetone is a particulrrly preferred non-solvent.

The preparation of the polycyclic carbonate oligomers of this inventions is illustrated by the following examples.

EXAMPLES 2–7

To a solution of 3.53 grams (10 mmol.) of bisphenol A bischloroformate in 10 ml. of methylene chloride was added a solution of 1 mmol. of the desired tetraphenol in about 0.5 ml. of tetrahydrofuran. The resulting solution was added over 40 minutes at room temperature, with stirring, to a mixture of 0.25 gram (2.5 mmol.) of triethylamine, 10 ml. of 2.5 N aqueous sodium hydroxide solution (25 mmol.) and 30 ml. of methylene chloride. After the addition was compeete, the organic layer was separated, washed twice with 1 N aqueous hydrochloric acid and once with water and dried. The solvent was removed by vacuum stripping and the polycyclic oligomers and high polymer were separated by dissolution of the polycyclic oligomers in acetone or by precipitation of high polymer from methylene chloride by addition of acetone. The results are given in Table I.

TABLE I

| | | Yield, % | |
|---|---|---|---|
| Example | Tetraphenol | Polycyclic oligomers | High polymer |
| 2 | Bis(2,4-dihydroxy-3-methylphenyl)methane | 60 | 32 |
| 3 | 2,2',4,4'-Tetrahydroxybiphenyl | 55 | 30 |
| 4 | 2,2',4,4'-Tetrahydroxybenzophenone | 72 | 26 |
| 5 | Bis(2,4-dihydroxyphenyl) sulfide | 55 | 33 |
| 6 | Bis(2,4-dihydroxyphenyl) sulfoxide | 56 | 33 |
| 7 | Bis(2,5-dihydroxyphenyl) sulfone | total 50 | |

EXAMPLES 8–9

To a solution of 17.65 grams (50 mmol.) of bisphenol A bischloroformate in 50 %1. of methylene chloride was added a solution of 5 mmol. of the deiired tetraphenol in 2 ml. of tetrahydrofuran. The solution was added over 40 minutes, at room temperature, to a solution of 0.25 gram of triethylamine in 150 ml. of methylene chloride. There were simultaneously added 50 ml. of 2.5 N aqueous sodium hydroxide (125 mmol.) and an additional 1 gram of triethylamine (total 12.4 mmol.), the latter being added incrementally. The product was worked up substantially as described in Examples 2–7. The results are given in Table II.

TABLE II

| | | Yield, % | |
|---|---|---|---|
| Example | Tetraphenol | Polycyclic oligomers | High polymer |
| 8 | Bis(2,4-dihydroxy-3-methylphenyl)methane | 78 | 21 |
| 9 | Bis(2,4-dihydroxyphenyl)sulfide | 75 | 20 |

EXAMPLES 10–20

A mixture of 45.6% grams (200 mmol.) of bisphenol A and 200 ml. of methylene chloride is stirred as gaseous phosgene is passed in for 50 minutes at 0.83 grams per minute (total 420 mmol.). At the same time, 88 ml. of 5 M aqueous sodium hydroxide (440 mmol.) is added incrementally to maintain the pH above 10.0. Stirring is continued for 15 minutes, after which the methylene chloride solution of the crude bischloroformate prodcct is separated and washed with 0.1 M aqueous hydrochloric acid.

The crude bischloroformate product is combined with bis(2,4-dihydroxy-3-methylphenyl)methane and the dihydroxy compounds or dithiols listed in Table III. In each case, the proportions of the tetraphenol and the listed dihydroxy compound or dithiol, based on total reagent A, are 10 mole percent each. The products are similar to those of Examples 2–9.

TABLE III

| Example | Dihydroxy compound or dithiol |
|---|---|
| 10 | 1,1-Bis(4-hydroxyphenyl)cyclohexane |
| 11 | 1,1-Bis(4-hydroxyphenyl)cyclododecane |
| 12 | 2,2-Bis(4-hydroxy-3,5-dimethylphenyl)propane |
| 13 | 2,2-Bis(4-hydroxy-3,5-dibromophenyl)propane |
| 14 | Bis(4-hydroxyphenyl) sulfone |
| 15 | 4,4'-Thiodiphenol |
| 16 | Bis(4-hydroxy-3,5-dimethylphenyl sulfone |
| 17 | 2,2-Bis(4-hydroxyphenyl)-1,1-dichloroethylene |
| 18 | Hydroquinone |
| 19 | 4,4'-Biphenyldithiol |

TABLE III-continued

| Example | Dihydroxy compound or dithiol |
|---------|-------------------------------|
| 20      | 1,12-Dodecanedithiol          |

The polycyclic oligomer mixtures of this invention are useful as intermediates for conversion to crosslinked polycarbonates or their thiol analogs. Accordingly, the present invention includes a method for the preparation of a crosslinked resinous composition which comprises contacting at least one of the previously defined polycyclic oligomer mixtures with a polycarbonate formation catalyst at a temperature up to about 350° C. The oligomer mixtures may frequently be employed in this method without separation of high polymer therefrom, but if desired, high polymer may be removed as previously described.

The polycarbonate formation catalysts which can be used in the resin formation method of this invention include various bases and Lewis acids. It is known that basic catalysts may be used to prepare polycarbonates by the interfacial method, as well as by transesterification and from cyclic oligomers. Reference is made to the aforementioned U.S. Pat. Nos. 3,155,683, 3,274,214, 4,217,438 and 4,368,315. Such catalysts may also be used to polymerize the polycyclic oligomer mixtures. Examples thereof are lithium 2,2,2-trifluoroethoxide, n-butyllithium and tetramethylammonium hydroxide. Also useful are various weakly basic salts such as sodium benzoate and lithium stearate, as well as tetraarylborates exemplified by the lithium, sodium, tetramethylammonium, tetra-n-butylammonium and tetraphenylphosphonium tetraphenylborates and similar compounds disclosed in copending, commonly owned application Ser. No. 723,672, filed Apr. 16, 1985, the disclosure of which is incorporated by reference herein.

Lewis acids useful as polycarbonate formation catalysts include dioctyltin oxide, triethanolaminetitanium isopropoxide, tetra(2-ethylhexyl) titanate and polyvalent metal (especially titanium and aluminum) chelates such as bisisopropoxytitanium bisacetylacetonate (commercially available under the tradename "Tyzor AA") and the bisisopropoxyaluminum salt of ethyl acetoacetate. Among the preferred catalysts are lithium stearate and bisisopropoxytitanium bisacetylacetonate.

The resin formation reaction is typically effected by merely contacting the polycyclic oligomrs with the catalyst at temperatures up to 350° C, preferably about 200°-b 300° C, until polymerization has proceeded to the extent desired. Although the use of a solvent is within the scope of the invention, it is generally not preferred. In general, the amount of catalyst used is about 0.001-1.0 mole percent based on structural units in the oligomers.

The preparation of crosslinked resinous compositions according to this invention is illustrated by the following examples.

EXAMPLES 21-27

Various polycyclic oligomer compositions of the type described in Example 2-9 were dissolved in methylene chloride; in Examples 22 and 27, high polymer was removed before dissolution. An amount of tetramethylammonium tetraphenylborate to provide 0.1 mole percent based on stuuctural units in the oligomers was added. The methylene chloride was removed by vacuum evaporation and the samples were dried at 80° C for 2 hours in a vacuum oven. They were then heated under nitrogen at 250° C until polymerization was complete. The percentage of crosslinking was determined by extracting uncrosslinked material from the samples with methylene chloride for 12-16 hours at reflux. The results are given in Table IV.

TABLE IV

| Example | Identity | Mole % | % crosslinked |
|---------|----------|--------|---------------|
| 21 | Bis(2,4-dihydroxy-3-methylphenyl)methane | 5 | 93 |
| 22* | Bis(2,4-dihydroxy-3-methylphenyl)methane | 5 | 95 |
| 23 | Bis(2,4-dihydroxyphenyl) sulfone | 5 | 70 |
| 24 | 2,2',4,4'-tetrahydroxybiphenyl | 5 | 90 |
| 25 | 2,2',4,4'-tetrahydroxybenzophenone | 10 | 89 |
| 26 | Bis(2,4-dihydroxyphenyl) sulfide | 5 | 90 |
| 27* | Bis(2,4-dihydroxyphenyl) sulfide | 5 | 98 |

*High polymer removed.

The crosslinked resinous compositions of this invention may optionally contain commonly known and used additives such as, for example, anti-oxidants, mineral fillers, reinforcing agents, impact modifiers, colorants, ultraviolet radiation absorbers such as the benzophenones, benzotriazoles, and cyanoacrylates; color stabilizers such as organopoosphites; hydrolytic stabilizers such as epoxides; and flame retardants.

Some particularly useful reinforcing agents which may be used separately or in combination are carbon, aramid, glass and boron fibers and other reinforcements which may be chopped, woven, knit, braided, wound or shaped by any conventional method. Some particularly useful flame retardants are the alkali and alkaline earth metal salts of organic sulfonic acids.

What is claimed is:

1. A composition comprising polycyclic oligomers having the formula

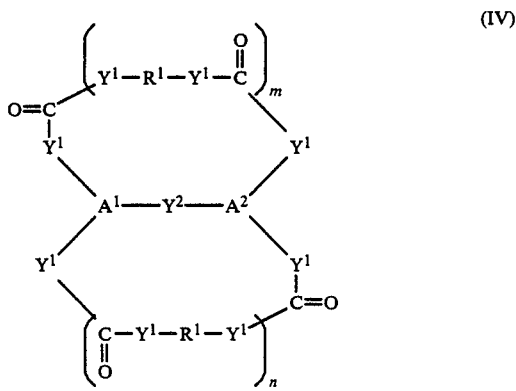

and

-continued

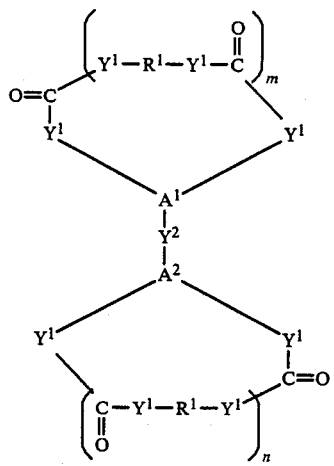

(V)

wherein:
each $R^1$ is independently a divalent aliphatic, alicyclic or aromatic radical;
each of $A^1$ and $A^2$ is a trivalent aromatic radical;
each $Y^1$ is independently oxygen or sulfur;
$Y^2$ is a bridging radical in which one or two atoms separate $A^1$ from $A^2$; and
m and n are integers from 1 to about 11.

2. A composition according to claim 1 wherein each $Y^1$ is oxygen and each $R^1$ has the formula $$-A^3-Y^3-A^4-\qquad(III)$$

wherein each of $A^3$ and $A^4$ is a single-ring divalent aromatic radical and $R^3$ is a bridging radical in which one or two atoms separate $A^3$ from $A^4$.

3. A composition according to claim 2 wherein each of $A^1$ and $A^2$ is an unsubstituted single-ring aromatic radical and $Y^2$ is methylene, carbonyl, thio, sulfoxy or sulfone.

4. A composition according to claim 3 wherein each of $A^3$ and $A^4$ is p-phenylene and $Y^3$ is isopropylidene.

5. A composition according to claim 4 wherein a major proportion of the oligomers have degrees of polymerization up to about 12.

6. A composition according to claim 5 which contains about 0.5–10.0 mole percent of units having formula II.

* * * * *